United States Patent [19]

Lambertus

[11] Patent Number: 5,094,606
[45] Date of Patent: Mar. 10, 1992

[54] ORIFICE PLATE FOR PRODUCING PLASTIC STRANDS IN WHICH A SMALL DISTRIBUTION CHANNEL IS PROVIDED TO MAINTAIN MELT FLOW VELOCITY

[75] Inventor: Friedrich Lambertus, Stuttgart, Fed. Rep. of Germany

[73] Assignee: Werner & Pfleiderer GmbH, Stuttgart, Fed. Rep. of Germany

[21] Appl. No.: 601,836

[22] Filed: Oct. 17, 1990

[30] Foreign Application Priority Data

Oct. 17, 1989 [DE] Fed. Rep. of Germany ....... 3934592

[51] Int. Cl.⁵ .............................................. B29C 47/30
[52] U.S. Cl. .................................... 425/311; 264/142; 425/464
[58] Field of Search ............... 425/311, 72.2, 376.1, 425/463, 382.2, 464, 382.4, DIG. 230; 264/142

[56] References Cited

U.S. PATENT DOCUMENTS

| | | | |
|---|---|---|---|
| 2,918,701 | 12/1959 | Hull et al. | 264/142 |
| 3,340,572 | 9/1967 | Lurie | 425/464 |
| 3,867,082 | 2/1975 | Lambertus | 425/464 |
| 3,892,834 | 7/1975 | Pritchard | 264/142 |
| 4,061,462 | 12/1977 | Giannarelli et al. | 425/464 |
| 4,242,075 | 12/1980 | Higuchi et al. | 425/464 |
| 4,621,996 | 11/1986 | Hundley, III | 425/464 |
| 4,728,276 | 3/1988 | Pauley et al. | 425/311 |
| 4,846,644 | 7/1989 | Lin | 264/142 |
| 4,934,916 | 6/1990 | Lambertus | 425/464 |

*Primary Examiner*—Jay H. Woo
*Assistant Examiner*—William J. Matney, Jr.
*Attorney, Agent, or Firm*—Ladas & Parry

[57] ABSTRACT

In pelletizing apparatus, an orifice plate forms plastic strands, the orifice plate having a distributor channel at its inlet side in the form of a grooved annular inlet. A cutting plate is provided with outlet openings which are connected to the distributor channel by inlet channels arranged around the distributor channel in successive adjoining relation. In order to improve the melt flow in the inlet region, the distributor channel has a cross-sectional width in the radial direction that is less than the radial extent of the inlet channels where they are joined to the outlet openings. The longitudinal axes of adjacent inlet channels are arranged at an angle of inclination relative to each other.

17 Claims, 3 Drawing Sheets

ORIFICE PLATE FOR PRODUCING PLASTIC STRANDS IN WHICH A SMALL DISTRIBUTION CHANNEL IS PROVIDED TO MAINTAIN MELT FLOW VELOCITY

MELT FLOW VELOCITY

1. Field of the Invention

The invention relates to an orifice plate for the pelletizing of plastic strands.

More particularly, the invention relates to such an orifice plate having a distributor channel which supplies plastic melt to inlet channels which, in turn, feed the plastic melt to outlet openings from which strands of plastic melt are discharged.

2. Description of Prior Art

Orifice plates are directly connected to an extruder for producing plastic strands from an extruded melt in the underwater pelletizing process. The orifice plate has outlet openings arrayed in annular fashion in several rows or according to a specific grid in an annular field. The strands are discharged from the outlets and are periodically cut by cutters to form pellets. The distances between the outlets for the strands are relatively large, in order to avoid adherence of the separated pellets at the edges of the cutter in the case of certain products. The annular distributor channel is made correspondingly large in cross section and is arranged at the entry to the orifice plate and connected to the outlet openings via the inlet channels. This construction is shown, for example, in DE-OS 22 36 823 and is equivalent, U.S. Pat. No. 3,867,082. A disadvantage of this construction is that a low flow velocity of the melt is obtained in the distributor channel which leads to the formation of depositions and thus to product impurities.

SUMMARY OF THE INVENTION

An object of the invention is to provide an orifice plate in which depositions will be avoided in the inlet region.

This and further objects of the invention are achieved by providing the distributor channel with a width in the radial direction which is less than the radial spacing of the inlet channels whereby they are joined to said outlet openings and by inclining the longitudinal axes of adjacent inlet channels connected to the distributor channel relative to one another.

By limiting the inlet cross section of the annular inlet acting as the distributor channel to a cross-section which corresponds approximately to the cross-sectional area of the subsequent inlet channels, a sufficiently high flow velocity of the plastic melt is obtained in this region, and product depositions are avoided. A latent contamination of the flowing product with the incorporation of older deposited product particles is thereby effectively prevented. The improvement of flow velocity in the inlet region of the orifice plate is advantageously obtained by the special arrangement of the inlet channels.

DE-PS 3809735 and its equivalent U.S. Pat. No. 4,934,916 disclose the arrangement of strand outlet openings at an angle of inclination relative to their longitudinal axes in order to assure sufficient strength in the strand outlet region of the orifice plate, despite a multiplicity of strand outlet nozzles. The improvement in the inlet ratios obtained in this way by means of a common conical inlet at the entry of the strand outlet openings is without effect on the flow ratio at the inlet side of the orifice plate.

Since the construction according to the invention produces an increase in the flow velocity in the distributor channel, the product depositions that usually occur here are prevented.

In accordance with the particular embodiments of the invention, the inlet channels connected to one row of outlet openings extend parallel to a central longitudinal axis of the orifice plate whereas the inlet channels connected to a second row of outlet openings extend at an angle relative to the central longitudinal axis.

According to a further embodiment, a third row of outlet openings is provided in the cutting plate, and the inlet channels connected to the middle one of the three rows extends parallel to the central longitudinal axis while the inlet channels extending to the two outer rows are respectively inclined in opposite directions relative to the central longitudinal axis.

In order to achieve substantially corresponding cross sectional areas of the distributor channel and the inlet channels, the radial width of the distributor channel is substantially equal to the diameter of an inlet channel. The inlet channels are disposed in substantially adjoining relation along the circumferential extent of the distributor channel.

Preferably the distributor channel is formed as an annular groove at the inlet side of the orifice plate and the inlet channels open directly into the annular groove to provide smooth transitional surfaces for the flow of the melt from the distributor channel into the inlet channels.

DETAILED DESCRIPTION OF PREFERRED EMBODIMENTS

Figure 1:
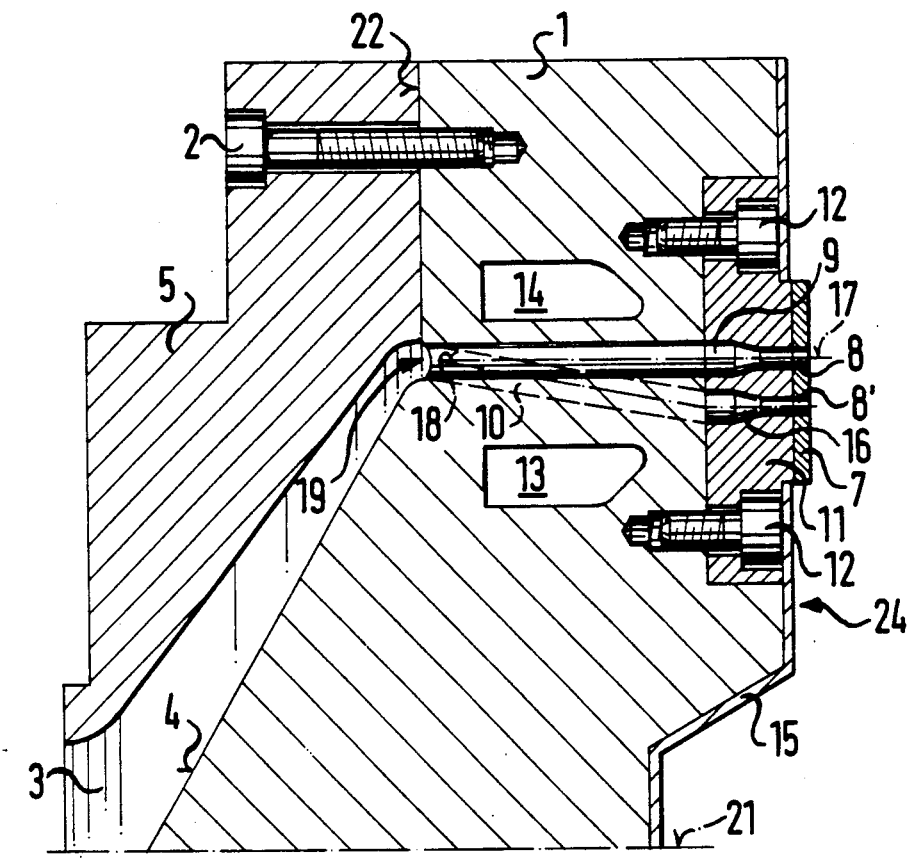
FIG. 1 is a sectional view of a portion of a pelletizing apparatus in which an orifice plate is provided with two rows of outlet openings.
Figure 2:
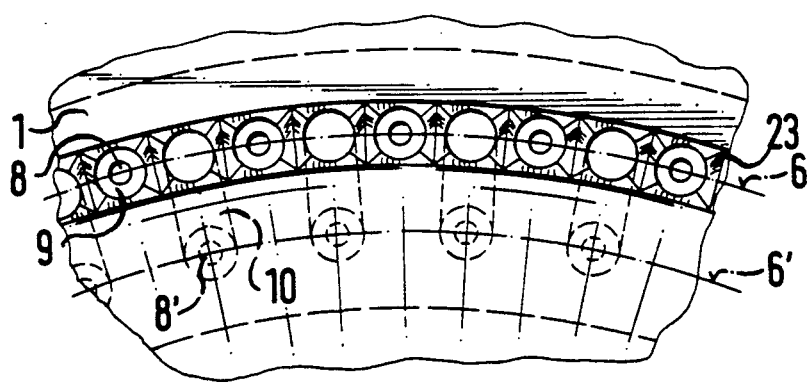
FIG. 2 is an elevational view at the inlet side of the orifice plate in FIG. 1 with the flange member removed.

FIGS. 1 and 2 show a portion of a pelletizing apparatus which is connected to an extruder (not shown) for receiving extruded melt therefrom. The pelletizing apparatus comprises an orifice plate 1 which is connected to a flange member 5 of the extruder by bolts 2. An annular inlet channel 3 is formed between the flange 5 and the orifice plate 1 for conveying melt from the extruder to a distributor channel 19 in the orifice plate 1. Inlet channel 3 is bounded at its inner side by a conical surface 4 at the back of the orifice plate 1 and at its outer side by a corresponding conical surface of the flange member 5. The distributor channel 19 is formed as an annular groove in the back surface 22 of orifice plate 1.

Two rows of outlet openings 8, 8' for discharge of melt strands are formed on concentric circles 6, 6' within a ring-shaped cutter plate 7. The radial distance between the circles 6, 6' is relatively small. The openings 8, 8' are connected to distributor channel 19 by means of inlet channels 9, 10 extending in part in the orifice plate 1 and in part in an insert member 11. Plastic melt flows from the extruder through channel 3 to distributor channel 19 and then to inlet channels 9, 10 and outlet openings 8, 8' for discharge as individual strands. The inlet channels 9, 10 and the outlet openings 8, 8' are formed as cylindrical bore holes. Distributor channel 19 which is in the form of the groove in the back surface 22 of orifice plate 1, defines limiting surfaces 23 which lead to the inlet channels 9, 10.

A cutting knife (now shown) for separating the plastic strands discharged from outlet openings 8, 8' into pellets is located adjacent to cutting plate 7.

As further shown in FIGS. 1 and 2, the cutting plate 7 is formed as a ring of circular annulus shape and cutting plate 7 is secured to insert member 11 which is joined to orifice plate 1 by bolts 12. Heating compartments 13, 14 are provided in orifice plate 1 in the region of inlet channels 9, 10. A layer of insulating material 15 is mounted on the front surface 24 of orifice plate 1 to prevent heat loss.

Extending in part in the insert member 11 are the strand outlet openings 8, 8' and the inlet channels 9, 10, these being arranged longitudinally in axial alignment. The inlet channels 9, 10 have funnel-shaped mouth regions 16 joined to the outlet openings 8, 8'. Within the orifice plate 1 the longitudinal axes 17 and 18 of inlet channels 9 and 10 respectively are disposed adjacent to one another such that they extend individually to common hole circles 6 and 6' from the distributor channel 19. The radial width of distributor channel 19 is less than the radial spacing of inlet channels 9, 10 at the inlet region to the outlet openings 8, 8'.

In the illustrated embodiment, the longitudinal axis 17 of each inlet channel 9 extends parallel to the central, longitudinal axis 21 of the orifice plate and in axial alignment with the corresponding outlet opening 8. The longitudinal axis 18 of each inlet channel 10 extends in the orifice plate 1 at an angle of inclination relative to the longitudinal axes 17 of inlet channels 9 and outlet opening 8. The arrangement may also be one in which longitudinal axes 17, 18 of both inlet channels 9, 10 are inclined relative to the longitudinal axis of the outlet openings 8, 8' and to the longitudinal axis 21 of the orifice plate. The angle of inclination of one or both inlet channels 9, 10 is determined by the predetermined spacing between the hole circles 6, 6'.

Figure 3:
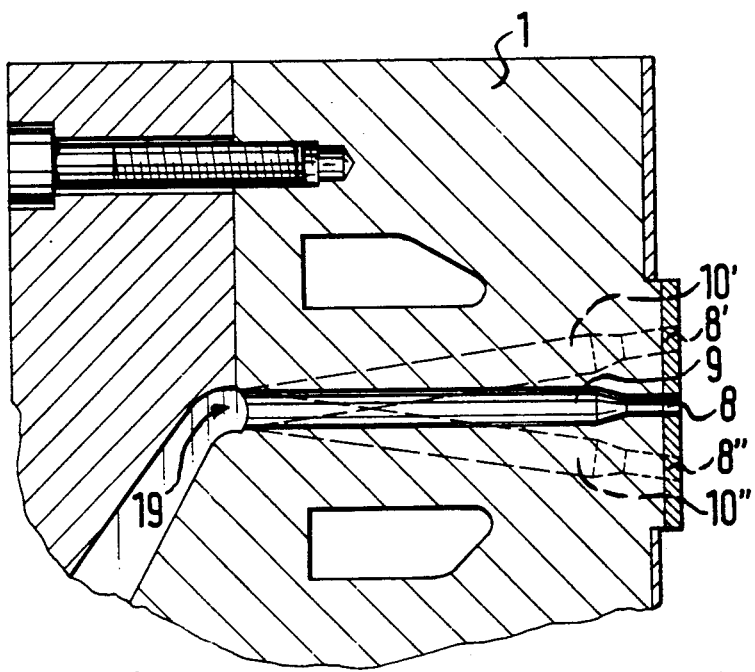
FIG. 3 is a sectional view similar to FIG. 1 in which a three-row arrangement of the outlet openings is provided.
Figure 4:
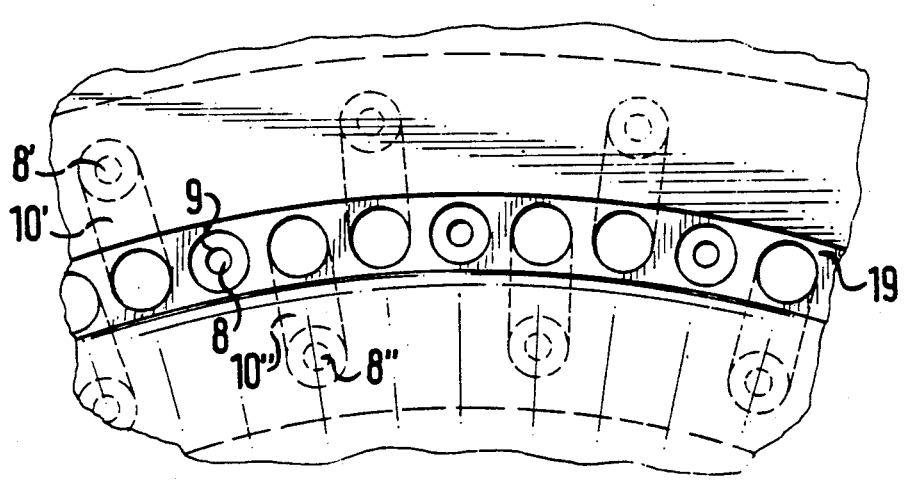
FIG. 4 is an elevational view similar to FIG. 2 for the orifice plate in FIG. 3.

FIG. 3 shows three rows of outlet openings 8, 8', 8" in orifice plate 1, the middle row of outlet openings being connected to inlet channels 9, which are arranged longitudinally and in axial alignment with the outlet openings 8. The adjacent outer rows of outlet openings 8' and 8" are disposed at respective opposite angles of inclination relative to the axis of middle channel 9, and are aligned with respective inlet channels 10', 10". All of the inlet channels 9, 10', 10" are individually connected to distributor channel 19 in successive adjoining relation and the radial width of channel 19 is less than the radial spacing of inlet channels 9, 10', 10" where they are joined to the outlet openings.

Figure 5:
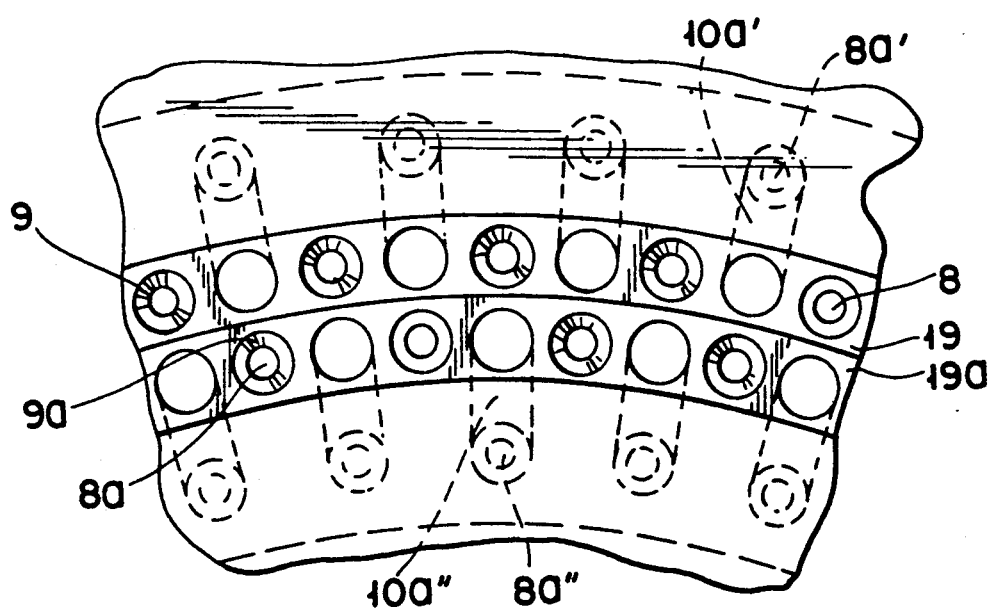
FIG. 5 is an elevational view similar to FIG. 4 for a modified embodiment.

FIG. 5 shows an arrangement in which two middle rows of outlet openings 8, 8a are connected to respective longitudinally and axially extending inlet channels 9, 9a. The inlet channels 9, 9a are connected to respective distributor channels 19, 19a. As in the arrangement in FIG. 1, alternate inlet channels of each row are inclined as shown at 10a' and 10a" to provide two further rows of outlet openings 8a' and 8a" each associated with a respective distributor channel 19, 19a. The distributor channels 19, 19a are connected to inlet channel 3 to receive melt therefrom.

All of the disclosed embodiments provide an advantageous introduction of the melt within the distributor channel 19 or 19a at the inlet region of orifice plate 1 such that the flow velocity in this region is not substantially reduced below the flow velocity within the respective inlet channels due to limitation of the distributor channel(s) within inlet channel 3 according to the invention.

Although the invention has been described in relation to specific embodiments thereof, it will become apparent to those skilled in the art that numerous modifications and variations can be made within the scope and spirit of the invention as defined in the attached claims.

What is claimed is:

1. In a pelletizing apparatus having a conical supply channel for extruded melt, an orifice plate with a distributor channel at an inlet side thereof, said distributor channel being connected to said supply channel to receive extruded melt therefrom, a cutting plate on an outlet side of the orifice plate, said distributor channel being of annular shape, said cutting plate being provided with two annular rows of circumferentially spaced outlet openings from which melt strands are discharged, said rows being spaced apart in a radial direction, said orifice plate having inlet channels with first ends joined to said distributor channel and second ends joined to said outlet openings, the improvement wherein said distributor channel is constituted as an annular groove in said orifice plate having a width in the radial direction which is less than the radial spacing of the inlet channels where they are joined to said outlet openings, said inlet channels being connected to said annular groove successively in adjacent relation, alternate channels extending from said groove along longitudinal axes which are inclined relative to one another.

2. The improvement as claimed in claim 1 wherein the annular rows of outlet openings are circular.

3. The improvement as claimed in claim 1 wherein the orifice plate has a central longitudinal axis, the inlet channels connected to one row of outlet openings extending parallel to said central longitudinal axis whereas the inlet channels connected to the other row of outlet openings extends at an angle relative to said central longitudinal axis.

4. The improvement as claimed in claim 3 comprising an insert member in said orifice plate, said cutting plate being mounted on said insert member, said outlet openings extending in said insert member, said inlet channels extending in part in said insert member parallel to said central longitudinal axis.

5. The improvement as claimed in claim 3 wherein three rows of outlet openings are provided in said cutting plate, the inlet channels connected to a middle one of said three rows extending parallel to said central longitudinal axis, the inlet channels extending to the two outer rows being respectively inclined in opposite directions relative to said inlet channels extending parallel to said central longitudinal axis.

6. The improvement as claimed in claim 5 wherein said inlet channels and said outlet openings are disposed on respective common longitudinal axes.

7. The improvement as claimed in claim 1 wherein said inlet channels have respective diameters which are substantially equal to the width of said distributor channel in the radial direction.

8. The improvement as claimed in claim 1 wherein said inlet channels have funnel-shaped ends joined to respective outlet openings.

9. The improvement as claimed in claim 1 wherein every second one of said inlet channels is inclined at an angle relative to the first ones of said inlet channels.

10. The improvement as claimed in claim 1 wherein every third one of said inlet channels extends parallel to a central longitudinal axis of said orifice plate, the first and second ones of said inlet channels extending at equal and opposite angles of inclination relative to said third inlet channels, three annular rows of circumferentially spaced outlet openings being provided, each connected to a respective one of the inlet channels.

11. The improvement as claimed in claim 1 wherein two distributor channels are provided, each connected to two respective rows of said outlet openings by respective inlet channels adjacent ones of which are inclined relative to one another.

12. The improvement as claimed in claim 11 wherein the orifice plate has a central longitudinal axis, the inlet channels connected to one row of outlet openings associated with each distributor channel extending parallel to said central longitudinal axis whereas the inlet channels connected to the other row of outlet openings associated with each distributor channel extends at an angle relative to said central longitudinal axis.

13. The improvement as claimed in claim 12 wherein said one rows of said outlet openings are adjacent to one another and said other rows of said outlet openings extend respectively radially inwards and outwards of said one rows.

14. The improvement as claimed in claim 1 wherein said inlet side of said orifice plate comprises a flat surface, said annular groove being formed in said flat surface and communicating with said conical supply channel, said inlet channels opening into said annular groove in closely spaced adjacent relation.

15. The improvement as claimed in claim 14 wherein said annular groove has a bottom remote from said flat surface of the orifice plate, said inlet channels opening into the bottom of the annular groove.

16. The improvement as claimed in claim 14 wherein said inlet channels extend along said annular groove in a row.

17. The improvement as claimed in claim 1 wherein the outlet openings in said two annular rows are angularly shifted from one another.

* * * * *